United States Patent
Artelsmair

(10) Patent No.: US 9,833,857 B2
(45) Date of Patent: Dec. 5, 2017

(54) METHOD FOR TEACHING/TESTING A MOTION SEQUENCE OF A WELDING ROBOT, WELDING ROBOT AND CONTROL SYSTEM FOR SAME

(75) Inventor: Josef Artelsmair, Wartberg/Krems (AT)

(73) Assignee: Fronius International GmbH, Pettenbach (AT)

(*) Notice: Subject to any disclaimer, the term of this patent is extended or adjusted under 35 U.S.C. 154(b) by 953 days.

(21) Appl. No.: 13/978,734

(22) PCT Filed: Jan. 10, 2012

(86) PCT No.: PCT/AT2012/050004
§ 371 (c)(1),
(2), (4) Date: Sep. 24, 2013

(87) PCT Pub. No.: WO2012/094689
PCT Pub. Date: Jul. 19, 2012

(65) Prior Publication Data
US 2014/0014638 A1   Jan. 16, 2014

(30) Foreign Application Priority Data

Jan. 10, 2011  (AT) ..................... A 27/2011

(51) Int. Cl.
*B23K 9/10*     (2006.01)
*G06F 19/00*    (2011.01)
(Continued)

(52) U.S. Cl.
CPC ............ *B23K 9/0953* (2013.01); *B23K 9/126* (2013.01); *B23K 9/1278* (2013.01)

(58) Field of Classification Search
CPC ..... B23K 9/0953; B23K 9/126; B23K 9/1278
(Continued)

(56) References Cited

U.S. PATENT DOCUMENTS 2,766,361 A * 10/1956 Landis ................. B23K 9/125
                                                 219/137.71
2,832,000 A *  4/1958 Steele ................. B23K 9/0735
                                                 219/124.03
(Continued)

FOREIGN PATENT DOCUMENTS

CN          1806989 A      7/2006
CN        101474708 A      7/2009
(Continued)

OTHER PUBLICATIONS

International Search Report of PCT/AT2012/050004, Jun. 22, 2012.
(Continued)

*Primary Examiner* — Dana Ross
*Assistant Examiner* — Ket D Dang
(74) *Attorney, Agent, or Firm* — Collard & Roe, P.C.

(57) ABSTRACT

The invention relates to a monitoring module (1 ... 1") for monitoring an electric arc machining process, the module comprising a camera (2), a photo flash lamp (3) and a control system (4) that controls the photo flash lamp (3) and a control system (4) that controls the photo flash lamp (3) in such a way that it illuminates when the camera (2) records the image. According to the invention, the components (2, 3, 4) are arranged in a common housing (5).

16 Claims, 6 Drawing Sheets

Figure 1:
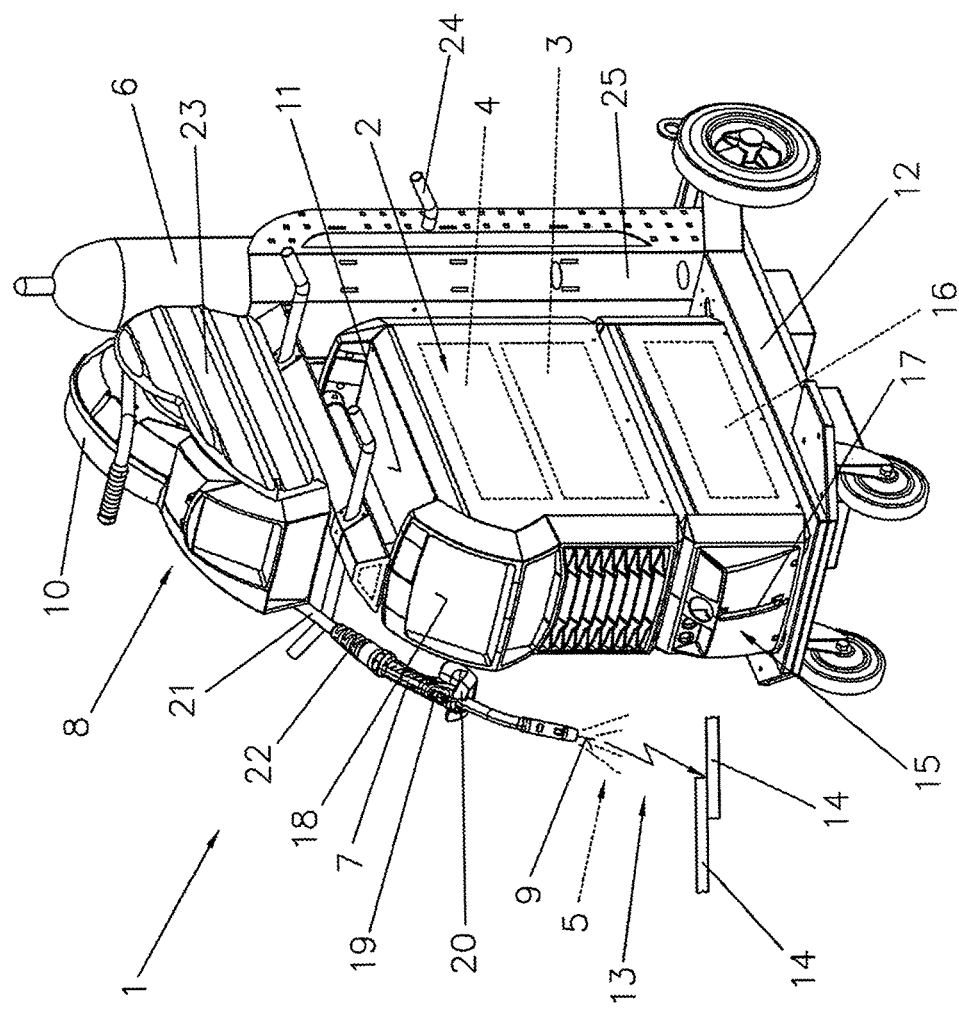

(51) Int. Cl.
    *B23K 9/095*      (2006.01)
    *B23K 9/12*      (2006.01)
    *B23K 9/127*      (2006.01)

(58) Field of Classification Search
    USPC ..... 219/130.01, 124.1, 130.4, 130.33, 130.5,
              219/130.51, 137 PS, 124.22, 124.34,
              219/125.1, 137.71, 137.8, 125.12;
              318/576; 700/96; 901/42
    See application file for complete search history.

(56) References Cited

U.S. PATENT DOCUMENTS

| | | | | |
|---|---|---|---|---|
| 3,141,085 A * | 7/1964 | Manz | ............... | B23K 9/0671 |
| | | | | 219/124.01 |
| 3,254,197 A * | 5/1966 | Anderson | ............ | B23K 9/0671 |
| | | | | 219/130.4 |
| 3,475,586 A * | 10/1969 | Normando | ............... | B23K 9/09 |
| | | | | 219/130.51 |
| 3,546,415 A * | 12/1970 | Marantz | ................. | B05B 7/224 |
| | | | | 219/136 |
| 3,627,978 A * | 12/1971 | Endo | ..................... | B23K 9/125 |
| | | | | 219/137 PS |
| 4,249,062 A * | 2/1981 | Hozumi | ................... | B23K 9/12 |
| | | | | 219/124.22 |
| 4,618,760 A * | 10/1986 | Murch | ................. | B23K 9/0678 |
| | | | | 219/130.4 |
| 5,225,660 A * | 7/1993 | Mita | ..................... | B23K 9/091 |
| | | | | 219/130.51 |
| 5,630,955 A * | 5/1997 | Kosaka | ............... | B23K 9/0672 |
| | | | | 219/125.1 |
| 5,916,464 A * | 6/1999 | Geiger | ................ | B23K 9/1336 |
| | | | | 219/130.4 |
| 6,563,084 B1 * | 5/2003 | Bandy | ................ | B23K 9/1278 |
| | | | | 219/124.34 |
| 6,791,062 B1 * | 9/2004 | Brunner | ............... | B23K 9/1276 |
| | | | | 219/124.34 |
| 6,933,466 B2 * | 8/2005 | Hutchison | .............. | B23K 9/091 |
| | | | | 219/130.21 |
| 2001/0013511 A1 | 8/2001 | Hong | | |
| 2002/0011474 A1 * | 1/2002 | Sasano | ................. | B23K 9/0953 |
| | | | | 219/137.71 |
| 2004/0074885 A1 * | 4/2004 | Takatani | ............... | B23K 9/022 |
| | | | | 219/130.5 |
| 2006/0163225 A1 | 7/2006 | Takahashi et al. | | |

FOREIGN PATENT DOCUMENTS

| | | |
|---|---|---|
| DE | 28 47 169 A1 | 9/1979 |
| DE | 690 27 236 T2 | 10/1996 |
| EP | 0 386 791 A2 | 9/1990 |
| EP | 0386791 A * | 4/1992 |
| EP | 1 123 769 A2 | 8/2001 |
| EP | 1 136 168 A2 | 9/2001 |
| JP | S58-047570 A | 3/1983 |
| JP | 58070970 A * | 4/1983 |
| JP | S58-070970 A | 4/1983 |
| JP | S61-088974 A | 5/1986 |
| JP | S61-092785 A | 5/1986 |
| JP | H06-238449 A | 8/1994 |
| JP | 11-216565 A | 8/1999 |
| JP | 2008-200725 A | 9/2008 |
| JP | 2009-262275 A | 11/2009 |
| WO | WO 01/34336 A1 | 5/2001 |

OTHER PUBLICATIONS

"Robot Has Tactile Seam Search Unit", Machinery and Production Engineering, vol. 142, No. 3656, Sep. 19, 1984 (Sep. 19, 1984), pp. 36-37, XP-001340709.

* cited by examiner

METHOD FOR TEACHING/TESTING A
MOTION SEQUENCE OF A WELDING
ROBOT, WELDING ROBOT AND CONTROL
SYSTEM FOR SAME

CROSS REFERENCE TO RELATED
APPLICATIONS

This application is the National Stage of PCT/AT2012/050004 filed on Jan. 10, 2012, which claims priority under 35 U.S.C. §119 of Austrian Application No. A 27/2011 filed on Jan. 10, 2011, the disclosures of which are incorporated by reference. The international application under PCT article 21(2) was not published in English.

The invention relates to a method for teaching a welding robot, in which a position is determined and stored by way of a manually implemented positioning process, comprising the steps moving a movably mounted welding wire out of a welding head, in particular a welding torch, to a length and moving the welding head to a position at a workpiece, preferably when the power supply of the welding head is deactivated. The invention also relates to a method for automatically positioning a welding head at a workpiece, in which method a preprogrammed position is approached.

The invention furthermore relates to a control system for teaching a welding robot, in which a position is determined and stored by way of a manually implemented positioning process, comprising a first outlet for actuating a first drive system, which is provided for moving the welding head to a position at the workpiece, preferably when the power supply of the welding head is deactivated, and a second outlet for actuating a second drive system, which is provided for moving the movably mounted welding wire out of a welding head, in particular a welding torch, to a length.

Finally, the invention relates to a welding system, comprising a welding device and a welding robot that are coupled to each other by means of lines, in particular a bus-system, and a welding torch attached to a welding robot, in particular at the last axis of the welding robot, with the welding torch being led along a predetermined track by the welding robot and the open-loop control and closed-loop control of the welding process carried out simultaneously being executed from the welding device.

For a long time, industrial robots have been used for very different tasks, among other things also for welding. This being the case, a welding head is led along a predefined track in order to perform the welding. According to prior art, some methods exits in order to program industrial robots, in this case, in particular welding robots:

It is one possibility to program a robot online. The programming of the robot is thus carried out directly at or with the robot itself. These programming methods include the teach-in-technique and the playback-method.

With the teach-in-method, the programmer uses a control panel by means of which he moves the robot into a position which is also contained in the motion sequence to be later executed automatically and stores this position. This sequence is repeated as long as the whole motion sequence to be carried out is stored. When executing the program, the robot than autonomously approaches all stored points. For the movement between the individual points, it is possible to enter additional parameters such as speed and acceleration of the welding head.

With the playback-method, the programmer traces the predetermined track by directly guiding the robot's arm. During the welding head is led, the coordinates are recorded by the robot and later converted into a robot program. The robot later repeats this exact motion sequence executed by the programmer.

Another possibility for programming welding robots is the offline-programming method. The program development is in this case carried out offline at a computer independent of the robot. The robot itself is not required therefor.

Offline-programming includes textual programming, CAD-supported programming, macro programming and acoustic programming. With the textual programming, the motion sequence is described by way of a problem-oriented language. The method is comparable with programming in a high-level programming language. In the event of frequently recurring work procedures, macros are created, which represent the frequently used instruction sequences in an abbreviated form. The macro is programmed once and subsequently inserted at the places of the control program where they are required.

With the CAD-supported programming, the robot is programmed on the basis of construction drawings and simulations. The entire motion sequence is in this case determined with a computer in a three-dimensional screen-environment, with usually the surrounding of the robot and its tools also being displayed. Frequently, construction drawings are directly converted into a motion sequence by means of a special conversion program, and it is possible for the motion sequence to be manually amended or corrected as necessary.

With the acoustic programming, the programming of the welding robot is finally performed by way of the natural speech supported by a microphone. The system converts the spoken instructions and on this basis generates the motion sequence to be performed.

All programming methods have in common that sooner or later a motion sequence is performed at the real machine. With the teach-in method and the playback-method, the motion sequence is not stored in the first instance. A motion sequence to be carried out later is trained with the robot. Once the motion sequence to be carried out is stored, whether by way of offline- or online-programming, this motion sequence may be checked. This is particularly important for the offline-programming, as the really existing problems may simply be over-looked in the virtual world later or are not even shown there.

Usually, when a motion sequence of a welding robot is taught and/or tested, no welding process is performed yet. Instead, the welding head can be equipped with welding wire, without the voltage necessary for welding being applied, or the current required for welding being provided. In this manner, the welding head can be trained or tested in a relatively riskless manner. The welding head takes in this case the same position with respect to the workpiece, as later while welding.

Due to lacks of skill with online-programming or failures in the programmed motion sequence, it may easily occur during the teaching and/or testing the same, that the welding wire, or in the worst case, the welding head itself collides with the workpiece and is damaged.

In the first case, it is usually possible for the problem to be solved in a relatively short time and at low costs by exchanging or shortening the welding wire (e.g. a bent welding wire may be shortened and subsequently moved out of the welding head by the shortened length). Although the material damage in the event of a damaged welding wire may be disregarded, a substantial loss of time, for example because the welding head is hardly accessible in the current position and/or is moved into a neutral position, may occur.

In the event of the latter it is frequently necessary to reset the motion sequence, so that a position already tested must unnecessarily be traced again. If the welding has been damaged, repairing the damage is usually even more time and cost-intensive.

Regarding these problems, some publications have been known from prior art. WO 2001/034336 A1, for example, discloses a method for positioning a welding torch or a welding wire in the center-line of a weld seam. A robot arm positions the welding torch in a predetermined and preprogrammed position between two seam flanks, whereupon a leveling step is carried out, in which the robot displaces the welding torch in one direction until a short-circuit between the welding torch or the weld seam and a weld seam of then workpiece occurs, whereupon the welding torch is then displaced in the opposite direction until another short-circuit between the welding torch or the welding wire and another seam flank of the work-piece occurs. By evaluating the displacement path, a control unit subsequently calculates a center-line of the weld seam on which the welding torch is positioned.

Further prior art is for example disclosed in DE 2 847 169 A1, DE 690 27 236 T2, JP 6238449 A and JP 58070970.

It is now the objective of the present invention to propose an improved method for teaching/testing the motion sequence of a welding robot. In particular the above-mentioned problems are to be voided.

The objective of the invention is achieved by a method of the above-mentioned kind, wherein:
  after been positioned at the position, a so-called wire-touch sensing process is started in the welding device, wherein:
  a test voltage is applied between the welding wire and the workpiece and
  subsequently, the manual positioning process is continued with the welding head,
  with the welding wire being retracted to interrupt the current flow when a current flow between the welding wire and the workpiece or a drop of the test voltage is detected.

The objective of the invention is furthermore achieved by the secondly mentioned way, wherein
  after been positioned, a so-called wire-touch sensing process is started in the welding device, wherein
  a test voltage is applied between the welding wire and the workpiece and the welding wire is fed in the direction of the workpiece and when a current flow between welding wire and workpiece is detected, the welding wire is retracted to interrupt the current flow, wherein
  subsequently, a preprogrammed track is traced, which preferably runs perpendicularly to the planned welding seam axis, wherein
  when the welding head is adjusted, the welding wire is repeatedly moved to the work-piece and back from the workpiece, i.e. the contour of the workpiece is sensed, and a defined position, in particular a central position, is calculated on the basis of the values of the wire lengths which have been fed.

The objective of the invention is also achieved by a control device of the above-mentioned kind, wherein
  the control system comprises a detection device for detecting a current flow in an electric circuit and means for starting a so-called wire-touch sensing process after the positioning at the position, with the wire-touch sensing process being set up for applying a test voltage between the welding wire and the workpiece and to continue subsequently the manual positioning process with the welding head and
  the control system is set up for outputting an instruction via the second output causing the retraction of the welding wire for interrupting the current flow when a current flow between the welding wire and the workpiece or a drop in the test voltage is detected.

The objective of the invention is finally achieved by a welding system of the above-mentioned type, wherein before a welding process is carried out, a manually controlled teaching-process, with which a position is determined and stored by way of a manually implemented motion sequence, the teaching-process comprising the following steps:
  moving the movably mounted welding wire out of the welding head to a length that may be predetermined and
  moving the welding head to a position at a workpiece when the power supply of the welding head is deactivated,
  starting the teaching-process in the welding device after been positioned at the position, wherein
  a test voltage is applied between the welding wire and the workpiece and
  subsequently, the manual motion sequence is carried out with the welding head,
  with the welding wire being retracted for cutting the current flow when a current flow between the welding wire and workpiece or a drop of the test voltage is detected and
  after the release, the welding wire is moved to the workpiece or to the length which may be predetermined, and wherein
  the welding wire is repeatedly moved to the workpiece and back from the workpiece along the contour of the workpiece, as long as the length has not been achieved.

According to the invention it is thus achieved that collisions between welding wire or welding head and workpiece are avoided or the consequences thereof are attenuated. For this purpose, a test voltage is applied between the welding wire and the workpiece. If the welding wire touches the workpiece, a current will flow in this electric circuit, where the welding wire and the workpiece are positioned in or the test voltage applied will drop. These changes in the states of current and voltage may be detected by means of detection means known from prior art, such as a current comparator or a voltage comparator. If such a case occurs, the welding wire will be retracted into the welding head. Additionally or alternatively, it is also possible for the welding head to be stopped or even retracted (e.g. in the direction opposite the original direction of motion).

In this way, it is possible to effectively avoid that the welding wire and the welding head are damaged. Due to the low mass inertia of the welding wire, the latter may be retracted so rapidly that no damage of the same will occur.

Due to its noticeably greater mass inertia, it is usually not possible for the welding head to be stopped or retracted so rapidly. In any case, a fast stopping or retracting of the welding head requires a considerable effort of energy and mechanical stress. It is therefore advantageous to rapidly retract the welding wire and to stop the welding head within the therefrom resulting clearance quickly but not jerkily, just as rapidly as to avoid any collision with the workpiece. In an advantageous variant, the robot control system knows, how far the welding wire projects beyond the welding head (in particular the contact tube), so that the stopping distance available is also principally known.

Advantageous embodiments and further embodiments of the invention are also disclosed in the description in connection with the Figures.

It turns out to be beneficial if the welding wire is after the interruption again moved to the workpiece or to the length that may be predetermined. In this way, the teaching/testing of the motion sequence may be continued with the original set up of the welding wire after a collision.

It is especially advantageous if the speed of feeding back the welding wire is selected as to be always higher than the speed of the forward motion of the manually controlled welding torch. In this way, a bending of the welding wire may be avoided, as with this variant of the embodiment the latter may be retracted from the workpiece more rapidly than the welding torch "follows". The welding wire is consequently lifted from the workpiece immediately.

It also beneficial if the welding wire is always moved out to a length the may be predetermined In this way, the initial state with respect to the moved out welding wire is always established. The operator or programmer of a welding robot does not need so much time to make himself/herself familiar with a new situation, if the welding wire has once been retracted. The teaching/testing of a motion sequence is thus considerably eased.

It is in this connection advantageous if the distance between the welding head (in particular of the contact tube) and the workpiece during the welding process corresponds to that distance, at which the welding wire moved out by the length that may be predetermined touches the workpiece. With this variant of the embodiment, the welding head takes the same position relative to the workpiece later, during the welding process, as during the teaching/testing of the motion sequence. The teaching/testing may thus be carried out with a considerably high practical orientation. It is thus possible to recognize and avoid an imminent collision of the welding head or the contact tube with the workpiece during the process of teaching already. It is thus relatively riskless to start the taught motion sequence in order to carry out the welding then.

In an advantageous variant of the embodiment, the welding wire is moved out until a current flow is detected, after the wire-touch sensing process has started. In this way, the distance between welding head and workpiece may be detected, without having to move the welding head in direction of the workpiece for this purpose. Detecting the said distance can therefore consequently be performed particularly safely.

It is particularly advantageous if the welding wire is repeatedly moved to the workpiece and back from the workpiece, i.e. the outlines are sensed as long as the length has not been achieved, when the welding head is being adjusted. In this connection, a method for teaching/testing a motion sequence of a welding robot, comprising these steps, is advantageous:
  a) Applying a test voltage between the welding wire and the workpiece by activating the wire-touch sensing process,
  b) Moving the welding head along the mentioned motion sequence at the workpiece,
  c) Moving the movably mounted welding wire out of the welding head until it touches the workpiece and thereby a current flow or a drop of voltage is detected in that electric circuit, wherein the welding wire and the workpiece are positioned,
  d) Retracting the welding wire by a retraction distance that may be predetermined, however, at least until the electric circuit is interrupted again (the welding wire is not touching the workpiece any longer) and repeating steps a) to d).

With this variant of the ebodiment, the welding wire is continuously moved out to the surface of the workpiece and a little back.again. The movement of the welding wire is similar to that of a needle in a sewing machine. This out and back-movement is beinq performed while the welding head is being moved along the said motion sequence at the workpiece. In this way, data with respect to the distance of the welding head to the workpiece may be gained permanently, and may e.g. be consulted for correcting a motion sequence to be learned or already stored. In particular with the online-programming method, the welding head. is frequently not moved with sufficient accurateness by the operator or the programmer, i.e. the wilding head is usually not moved at a constant distance to the workpiece. Due to the permanent sensing by the welding wire, the robot is quasi able to "guess" what is desired by the operator and optimize or correct the provided motion sequence with respect to the constant distance between welding head and workpiece. At this point, it should be noted that by repeatinq step a) the repeated application of the test voltage as well as the permanent application of the letter is meant. Within this meaning, it is possible that a repetition of the steps b) to d) is sufficient, when a test voltage is applied permanently. It should be noted that the method formed from the above mentioned steps a) to d) may be construed as an independent invention, also independent of other features.

It is also beneficial, if the length, by which the welding wire is moved out of and/or back into the welding head is measured, in particular manually measured, or set via the input and/or output device or defined by touching the workpiece. In this way, the control system according to the invention always knows at which position the welding wire or its end or tip is.

It is advantageous, if the test voltage or the therefrom resulting current flow is provided to be lower than a voltage required for forming an arc/a current required for forming an arc. It is in this way possible to prevent the surface of the workpiece from damage, as no material removal will result from the contact between welding wire and workpiece.

It is also advantageous, if the test voltage or the therefrom resulting current flow is provided to be lower than a voltage required for melting the welding wire/a current required for melting the welding wire. Also in this way, it may be avoided that the surface of the workpiece is damaged. It may furthermore by avoided that the actual length, the welding wire is moved out to, is smaller than that length assumed by the control system according to the invention. The latter does usually not have any information about the fact whether or how much of the welding wire has been melted.

It is in this connection also beneficial, if the current source limits the amount of power in such a way, that a short-circuit does not result in a melting of the welding wire and the workpiece, but the contacting of both of them is recognized as soon as possible, with however the further monitoring, open-loop and closed-loop functions for the actual welding process, such as the release of short-circuit, the wire feed, the protective gas supply, the cooling circuit, etc. of the welding device remaining deactivated. Advantageously, modules that are not required during the training of the robot are switched off, what on the one hand increases the safety, on the other hand also reduces the consumption of energy.

It is particular advantageous, if the test voltage or the therefrom resulting current flow is provided to be higher than a voltage required for forming an electric arc/a current required for forming an electric arc, but lower than a voltage required for melting the welding wire/a current required for melting the welding wire. It is in other words particular advantageous if the test voltage or the current flow resulting therefrom is such adjusted that for a very short period, a small electric arc is ignited when the welding wire is lifted from the workpiece, the thermal energy of which electric arc is due to its short spark duration nevertheless low enough, that no melting of welding wire or the workpiece follows. The advantage of this is that the well visible flash formed thereby enables the operator to recognize the position of the wire ending at the workpiece very well and that this takes place at a place that is usually monitored by the operator. This is even more advantageous, if additionally the light conditions at the place to be programmed are poor.

It is also of particular advantage if
the welding head is moved in the area of a finished welding seam or a welding seam to be produced perpendicularly to the course of the seam,
the position of the welding head and optionally that of the welding wire is stored or detected, when a current flow is detected in said electric circuit, and
on the basis of several stored or detected positions, the width/height of the welding seam and/or the position of the welding head or the welding wire relative to the welding seam is calculated.

With this variant of the invention, the welding robot and the current source act less like a welding system but more like a measurement device. For example, the welding wire therefor protruding into a prepared V seam is moved back and forth in order to "sense" the position of the parts of the workpiece. Likewise, the protrusion of a finished welding seam may be measured. It is in this way possible to detect geometric parameters of the already finished welding seam or the welding seam to be produced. It is also conceivable to produce surface profiles or 3D illustration of the welding seam by scanning in a grid like manner. It is in this way also possible to measure or assess the waviness of a welding seam for example. By means of this variant of the invention, the scope of functions of a welding system is dramatically extended, as it may not only be used for welding but also for quality inspection. It is not even required for it to be modified for this purpose, as the "probe" is formed from the welding wire. As a result, also the time consuming application of the workpiece onto an only therefor provided measurement system is omitted.

It is furthermore advantageous if the longest stickout (i.e. the length, by which the welding wire projects beyond the welding torch) is determined during the evaluation of the welding wire feeding process, to which stickout the central position of the welding seam corresponds. As the (unfinished) welding seam usually has the deepest point in its center, the center may simply be found by storing the position, where the longest stickout has been detected. Vice versa, the (finished) welding seam has its highest point usually in the center, so that its center may simply be detected by storing the position where the shortest stickout has been recognized.

It is furthermore beneficial if an alarm is triggered when a current flow or a drop of voltage is not detected, although this might be expectable on the basis of the position of the welding head or the welding wire and the coordinates of the workpiece. These problems are mainly present when the shape of the workpiece and its position relative to the welding robot are known, i.e. essentially when an already programmed motion sequence is to be tested. If the tip of the welding wire assumed by the robot control system is moved to the workpiece without a current flow or drop of voltage resulting, the scenario assumed by the robot control system does obviously not correspond to reality, and an alarm is triggered.

It is in this connection particularly advantageous, if a tolerance value of a length and/or—if the welding head/the welding wire is moved—a tolerance value of a time period is taken into consideration for triggering the alarm. In order to avoid for the alarm to be triggered in the event of the smallest irregularities, a tolerance value may also be taken into consideration for triggered an alarm. That tolerance value may be limited in its length—or provided that the welding head and/or the welding wire are being moved—also be limited with respect to time period.

Usually, a drive system for the welding wire is present. In this case, it is particularly easily possible to realize the invention. It is additionally easily imaginable that already existing welding robots are upgraded in terms of the functions according to the invention. The field of application of the invention is thus considerably increased. Furthermore, welding wires are mostly comparably thin and are therefore very suitable as "probes", with the result that the welding robot might not only be used for welding but also for quality inspection.

Particularly advantageous is a method where a test voltage is applied between an electrically conductive part of the welding head and the workpiece and the welding head is stopped or retracted when in an electric circuit, wherein said conductive part and the workpiece are positioned, a current flow or a drop of voltage is detected. With this variant of the invention, the already mentioned principles and the therefrom resulting advantages are directly applied to the welding head, by detecting contacts of electrically conductive parts of the same, for example a metallic gas nozzle, and the workpiece. If this is the case, a current flow inside the mentioned electric circuit is detected. This variant of the embodiment is in this case not limited to the teaching/testing of a motion sequence but may also be used during welding process itself. In this way, it is possible to recognize undesired contacts between welding head and workpiece, also while a motion sequence is being processed, and to alleviate the consequences.

It is advantageous with a welding system according to the invention, if an automatic detection of the center position of a weld bead is carried out, with which the welding robot moves the welding torch perpendicular to the welding bead. In this way, the center of the welding bead can be detected automatically and without any danger.

It is in this connection of advantage, if the welding wire, during the movement of the welding torch perpendicular to the welding bead, in particular to a fillet weld, is permanently moved towards the workpiece and back again, and subsequently, an evaluation of the welding wire feed is carried out. This measure particularly effectively avoids that the welding device collides with the workpiece, as the welding wire always contacts the workpiece only for a very short time.

It is beneficial, if the welding robot comprises a welding current/voltage source, which is prepared for generating the test voltage. In this way, the welding current/voltage source may provide a double benefit, namely allow the welding and the teaching/testing of a motion sequence.

It is finally also beneficial, if the welding robot comprises a welding current/voltage source and a further voltage/ current source that is provided for generating the test voltage. With this variant, a separated voltage/current source for generating the test voltage is thus provided. In this way, the test voltage can in certain circumstances be generated more easily, as several magnitudes may be present in particular between welding current and test voltage.

In the context of the invention, a "voltage/current source" means each electrical source of energy having any characteristic. Advantageously, for both, the welding and the teaching/testing a motion sequence, energy sources are used having the correspondingly therefor required, selectable characteristics, but of course in significantly different current ranges.

It should at this point be noted that die variants mentioned relating to the method according to the invention and the therefrom resulting advantages similarly refer to the control device according to the invention as well as to the welding robot according to the invention or to the welding system according to the invention. The same of course applies vice versa. It is for the above-mentioned measures additionally possible to be combined in any way.

For a better understanding of the invention the latter is explained in more detail with reference to the following figures.

Figure 2:
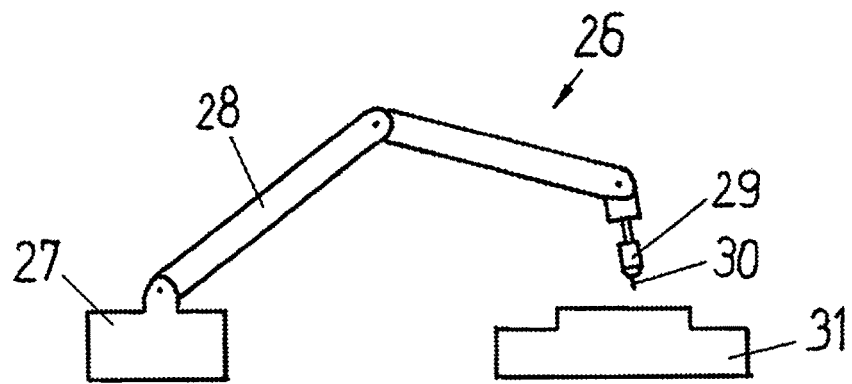
Figure 3:
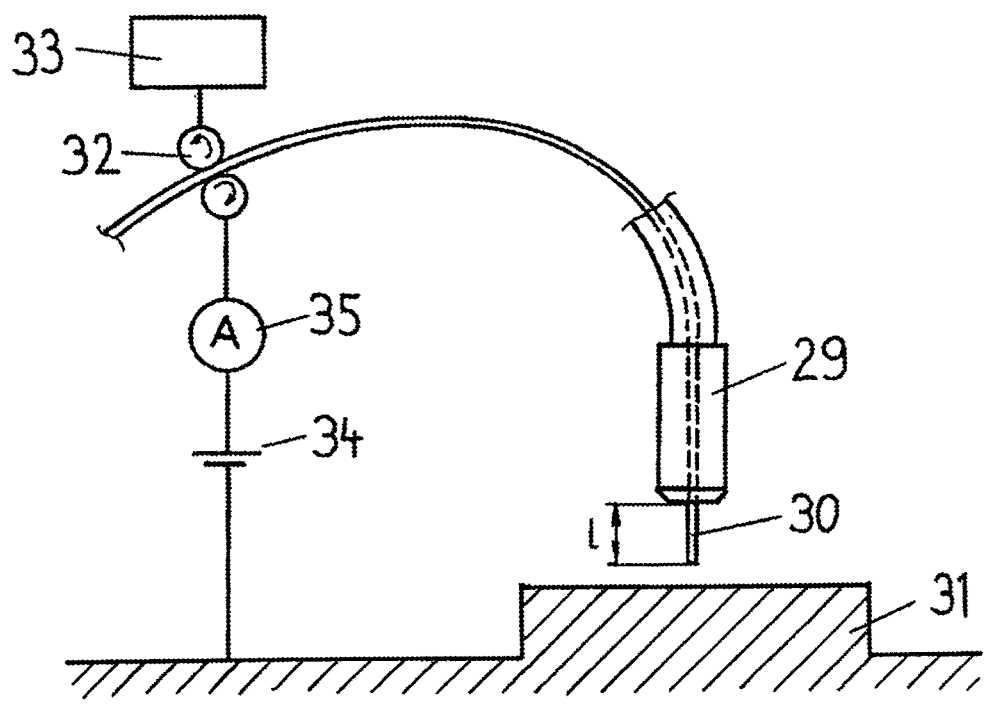
Figure 4:
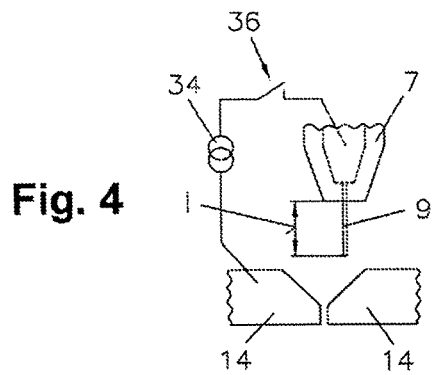
Figure 5:
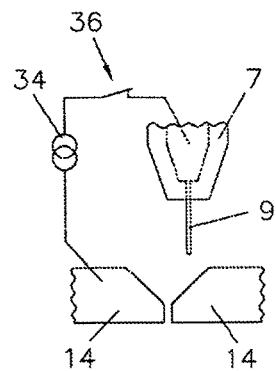
Figure 6:
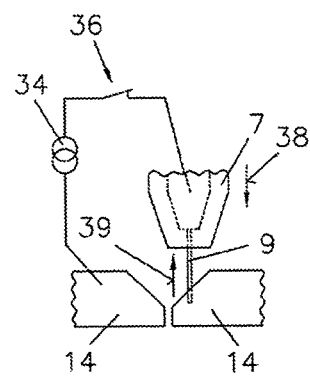
Figure 7:
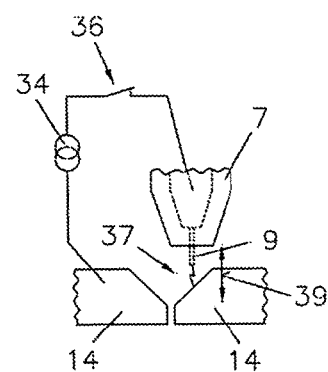
Figure 8:
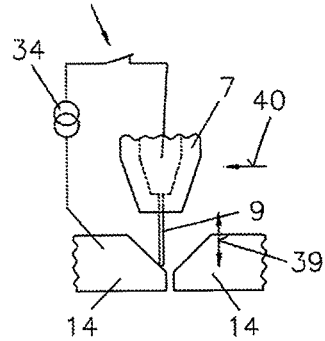
Figure 9:
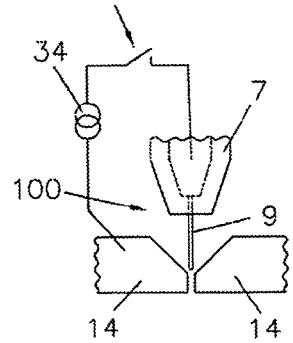
Figure 10:
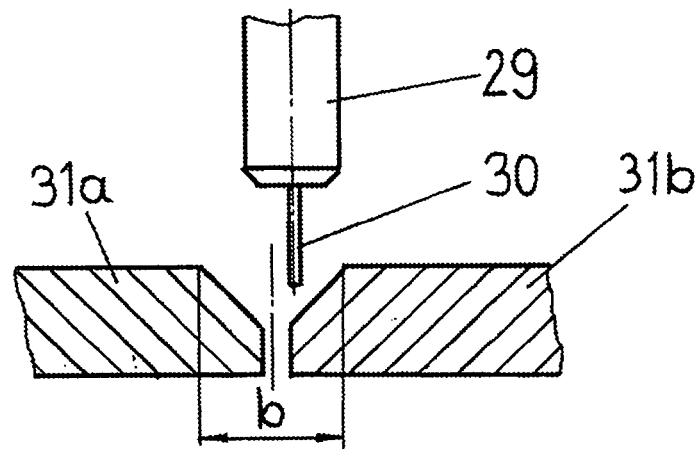
Figure 11:
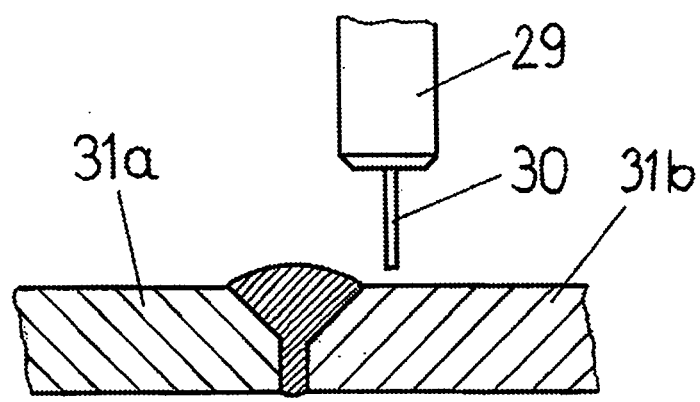
Figure 12:
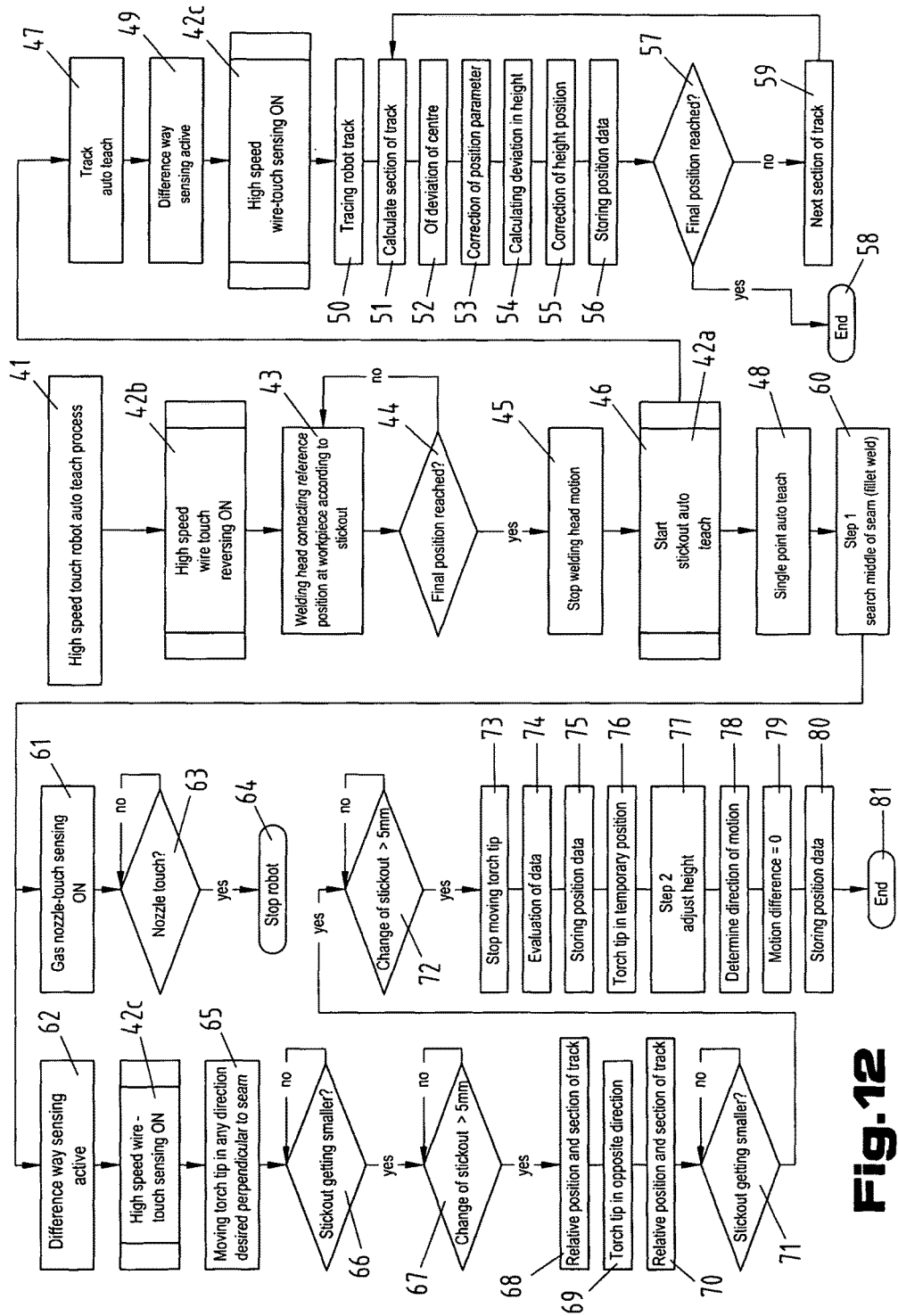
Figure 13:
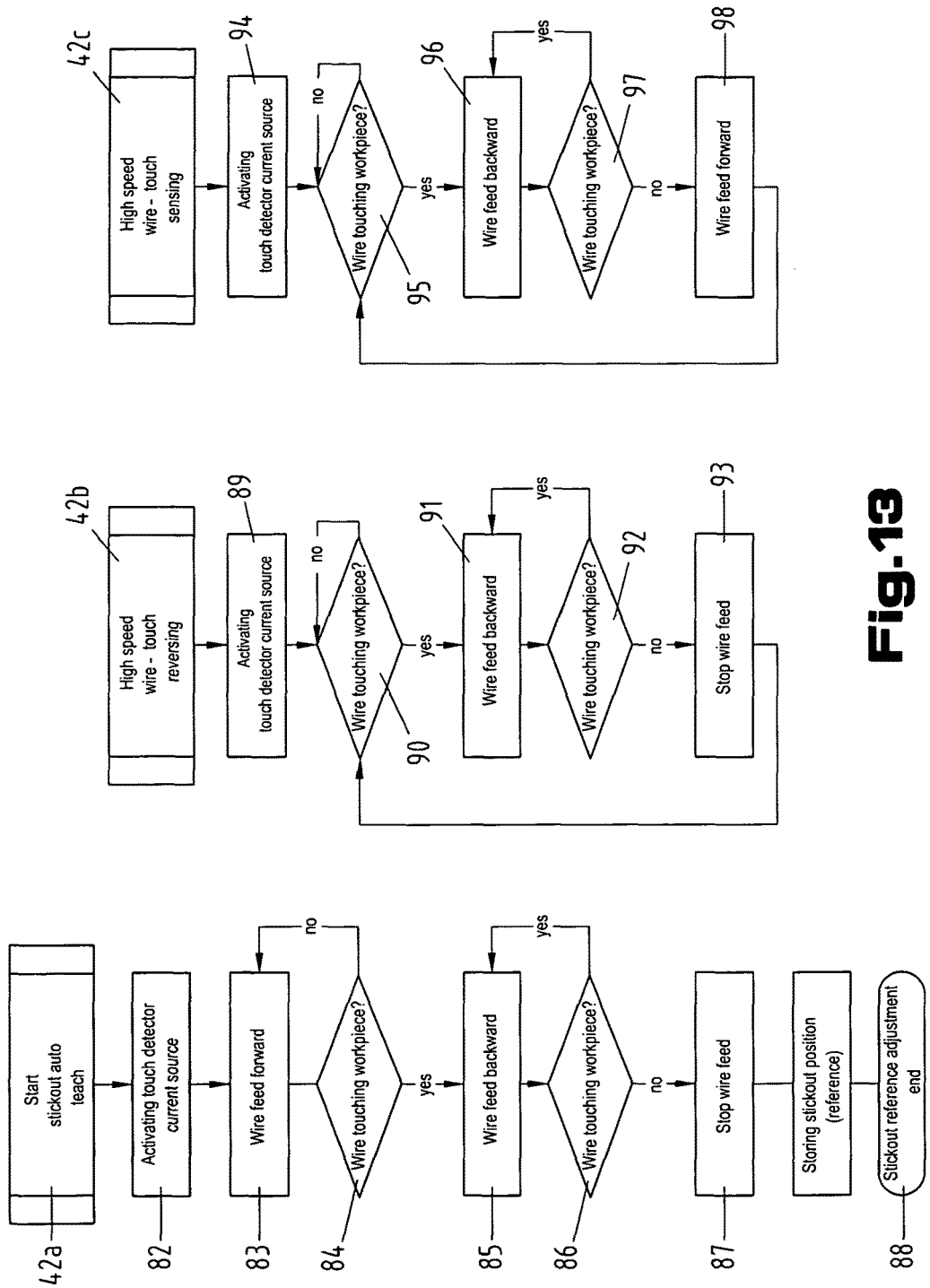

The heavily simplified schematics show:

FIG. 1 a schematic drawing of a welding apparatus or a welding device;

FIG. 2 a schematic drawing of a welding robot;

FIG. 3 a basic circuit diagram of the test voltage circuit according to the invention;

FIG. 4 a welding torch positioned above two workpieces that are prepared for a welding seam before a wire-touch-sensing process;

FIG. 5 the welding torch from FIG. 4 after the wire-touch sensing process has been started;

FIG. 6 the welding torch from FIG. 4 after moving towards a workpiece;

FIG. 7 the welding torch from FIG. 4 after the welding wire has been retracted;

FIG. 8 the welding torch from FIG. 4 after moving towards the other workpiece;

FIG. 9 the welding torch from FIG. 4 after detecting the center of the welding seam;

FIG. 10 a y-welding seam to be measured before its production;

FIG. 11 a y-welding seam to be measured after its production;

FIG. 12 a flow chart for visualisation of the method according to the invention and FIG. 13 sub-routines for the flow chart according to FIG. 12.

It must first be stated that in the various embodiments described, identical parts have been marked with the same reference identifiers and the same parts descriptions. It is therefore possible to transfer the disclosures contained in the overall description to the identical parts with the same reference identifiers or the same parts descriptions. The selected positioning terms are used in the description, such as top, bottom, side etc., which refer directly to the described and the depicted figures and which can be correspondingly transferred to the new position in the event of a change in position. Furthermore, individual characteristics or combinations of characteristics from the various embodiments shown and described can present independent or inventive solutions, or solutions according to the present invention.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIG. 1 shows a welding device 1 known per se or a welding system for very different processes or methods, such as MIG/MAG welding or WIG/TIG welding or electrode-welding methods, double-seam/tandem welding methods, plasma or soldering processes, etc.

The welding device 1 comprises a current source 2 with a therein arranged power element 3, a control device 4 and further components and lines, such as a toggle switch, control valves, etc., not shown. The control device 4 is for example connected to a control valve, which is arranged in a supply line for a gas 5, in particular a protective gas, such as $CO_2$, helium or argon or suchlike, between a gas tank 6 and a welding torch 7 or a torch.

It is furthermore possible to actuate also a wire feed 8, which is frequently used for MIG/MAG welding, via the control device 4, with an additional material or a welding wire 9 being fed from a delivery spool 10 or a wire coil into the region of the welding torch 7 via a supply line. It is naturally possible that the wire feed 8, as known from prior art, is integrated in the housing 11 of the current source 2, and not, as shown in FIG. 1, positioned on a carriage 12 as an accessory device. There is in this case the talk of a so-called "compact welding device" 1. It is in this case also possible that the wire feed 8 may be directly attached onto the welding device 2, i.e. that the housing 2 is embodied on the upper side for holding the wire feed 8, so that the carriage 12 may be omitted.

It is also possible that the wire feed 8 feeds the welding wire 9 or the additional material to the process place outside the welding torch 7, with for this purpose preferably a non-melting electrode being arranged in the welding torch 7, as it is common for WIG/TIG welding.

The current for building up an arc 13, in particular a working arc, between the electrode or the welding wire 9 and a workpiece 14 preferably made of one or more parts is supplied to the welding torch 7, in particular the electrode or the welding wire 9 via a welding line, not shown, from the power element 3 of the current source 2, with the workpiece 14 to be welded being connected to the current source 2 (not shown) via a further welding line for the further potential, in particular the earth cable, and thus an electric circuit for a process may be created via the arc 13 or the plasma beam built. When a plasma torch with interior arc 13 is used, both welding lines, not shown, are led to the torch, so that a corresponding electric circuit may be set up in the torch, as it may be the case with plasma torch.

For cooling the welding torch 7, the welding torch 7 can be connected to a fluid container, in particular a water container 16 having a fill level indicator 17, via a cooling device 15 by interconnecting possible components, such as a flow indicator, whereby the cooling device 15, in particular a fluid pump arranged for the fluid used in the water container 16, is started when the welding torch 7 is started and consequently, a cooling of the welding torch 7 may be caused. As illustrated in the exemplary embodiment shown, the cooling device 15 is positioned on the carriage 12, where subsequently the current source 2 is put onto. The individual components of the welding system, i.e. the current source 2, the wire feed 8 and the cooling device 15, are in this case embodied in such a way that the latter have corresponding projections or recesses, so that it is possible to stack or put them onto one another securely.

The welding device 1, in particular the current source 2 has furthermore an input and/or output device 18, by means of which the different welding parameters, operating modes or welding programs can be set or started and shown. This being the case, the welding parameters, operating modes or welding programs set by means of the input and/or output device 18 are transmitted to the control device 4 and the latter subsequently actuates the individual components of the welding system or the welding device 1 or the corresponding desired values for the open-loop control or closed-loop control are pre-set. This being the case it is also possible that, if a corresponding welding torch 7 is used, pre-setting processes can also be made by means of the welding torch 7, with the welding torch 7 being equipped with an input and/or output device 19 for this purpose. This being the case, the welding torch 7 is preferably connected to the welding device 1, in particular the current source 2 or the wire feed 8, via a data bus, in particular a serial data bus. For initiating the welding process, the welding torch 7 mostly has a start switch, not shown, so that the arc 13 can be ignited by actuating the start switch. In order for welding torch 7 to be protected against a high level of heat radiation by the arc 13 it is possible that it is equipped with a heat shield 20.

In the shown embodiment, the welding torch 7 is furthermore connected to the welding device 1 or the welding system via a hose assembly 21, with the hose assembly 21 being connected to the welding torch 7 via a kink protector 22. In the hose assembly 21, the individual lines, such as the supply line or lines for the welding wire 9, for the gas 5 for the cooling circuit, for the data transmission, etc. from the welding device 1 to the welding torch 7 are disposed, whereas the earth cable is preferably connected to the current source 2 in a separated way. The hose assembly 21 is connected to the current source 2 or the wire feed 8 via a coupling device (not shown), whereas the individual lines in the hose assembly 21 are connected to or in the welding torch 7 by means of a kink protector. In order to enable for the hose assembly 21 a corresponding strain relief, the hose assembly 21 can be connected to the housing 11 of the current source 2 or the wire feed 8 via a strain relief device, not shown.

It should generally be noted that for the different welding methods or welding devices 1, such as WIG devices or MIG/MAG devices or plasma devices, not all of the above-mentioned components are used or have to be used. It is in this context e.g. possible for the welding torch 7 to be designed as an air-cooled welding torch 7, so that e.g. the cooling device 15 may be omitted. It is furthermore possible that also other parts or components can be arranged or inserted, such as a rub protector 23 at the wire feed 8 or an option carrier 24 at a holding device 25 for the gas tank 6, etc.

FIG. 2 heavily simplified shows a welding robot 26 having a robot base 27, a robot arm 28 and a welding head 29 beyond which the welding wire 30 projects. FIG. 2 additionally shows an exemplary workpiece 31. The welding robot 26 shown in FIG. 2 now has a first drive system known per se having a first drive control (not shown) for the welding head 29. The welding robot 26 can furthermore comprise the assembly groups mentioned in connection with FIG. 1 in a generally known combination.

FIG. 3 shows a simplified electric circuit diagram of the welding robot 26. This shows the welding head 29 with the welding wire 30 projecting beyond the workpiece 31. The welding wire 30 can be moved out of the welding head 29 and also retracted again via two rollers 32, with at least one of them being driven. The drive roller(s) form the second drive system hence. This is actuated by a second drive control 33. Between the rollers 32 and the workpiece 31, a voltage/current source 34 as well as a series-connected ammeter 35 are connected. Additionally or alternatively thereto, also a voltmeter (not shown) for measuring the test voltage generated by the voltage/current source 34 can be provided. Advantageously, also the length by which the welding wire 30 is moved out of the welding head 29 may be measured, e.g. with the help of rotary encoders on the rollers 32 or by optical image processing, where the surface structure of the welding wire 30 passing an optical sensor is evaluated.

A first variant of function of the welding robot 26 shown in FIGS. 2 and 3 is the following: In a first step, the welding wire 30 is moved out of the welding wire 29 by a length l ("stickout") that may be predetermined. Then, a position at the workpiece is approached. The latter may be approached manually, e.g. in order to determine a motion sequence for the welding robot 26 ("teach-in"), or be approached automatically, e.g. in order to test a stored motion sequence. In particular with methods known from prior art, the motion sequences that are still partially immature in this phase result in frequent and frequently rough contacts between the welding wire 30 and the workpiece 31. In an extreme case, the welding head 29 may even hit the workpiece 31. This results in a bending of the welding wire 30 or even in a damage of the welding head 29. Both implicates of a loss of time during the teaching/testing process, as the bended endings of the welding wire are required to be removed manually and/or the welding head 29 is to be repaired.

In a simplified way, FIGS. 4 to 9 now show a sequence of a teaching process, by which at least one initial position and/or end position at the workpiece 14 or workpiece 31 is set and stored for the welding torch 7 or the welding head 29. Usually, a plurality of such positions is set manually, so that subsequently, a corresponding welding process along a track may be carried out by calculating the positions lying between. In this case, the process is carried out manually by the user and serves for storing the very different positions along the workpiece 14.

With the so-called teaching, the user at first controls the welding torch 7, which is connected to the end, in particular to the last axis of the welding robot 26, via a robot operator panel using a manual setting process of the welding robot in such a way that the welding torch 7 is e.g. positioned above the workpiece 14 as it may be seen in FIG. 4. At this point, the power supply of the welding torch 7 and further open-loop control and closed-loop control systems of the welding device 1 are usually deactivated, so that it is impossible that unexpected current flows with an undesired short-circuit may result. Before positioning the welding torch 7, the user preferably firstly shortens the welding wire 9, i.e. it is pinched off at the end face of the contact tube and subsequently moved out by a predetermined length l, i.e. a so-called "stickout", so that the welding wire 9 correspondingly takes the correct position for the welding. This process may be carried out by the user manually at the welding device 1, or—if available—via the operator panel. It is thus possible to determine the positions with the stickout l required for the welding process. This bears the advantage that the corresponding distance between welding torch 7 and workpiece 14 may be observed during the teaching by way of the required stickout l.

Once the user has positioned the welding torch 7 approximately above a desired initial position at the workpiece 14 with a corresponding stickout-length l (see FIG. 4), according to the invention, a so-called "wire-touch sensing process" is started in the welding device 1, as it is schematically illustrated in FIG. 5 by activating the switch 36.

This may be effected in very different ways. This process can for example be activated by activating a button/switch 36 on a robot operator panel (not shown), or the user operates a button 36 at the welding device 1 or at a remote adjuster. As the teaching process is being activated, the welding torch 7, in particular the welding wire 9, and the workpiece 14 are connected to a teaching current source 34 in the welding device 1, so that an electric circuit may be established between the latters. It is naturally possible to use also the power element, i.e. the current source 2 of the welding device 1 instead of the teaching-current source 34 especially used therefor. The task of the current source 34 is to limit the amount of energy in such a way that in the event of a short-circuit, i.e. if the welding wire 9 contacts the workpiece 14, no melting of the welding wire 9 and the workpiece 14 results, but the contacting of the latter is detected as soon as possible, with nevertheless the other monitoring, open-loop and closed-loop functions, such as short-circuit release, wire feed, protective gas supply, cooling circuit, etc., of the welding device 1, which functions are required for the usual welding process remaining deactivated. The current supply 34 preferably releases such a high amount of energy, that a slightly visible short arc 37 is ignited when the welding wire 9 is lifted from the workpiece 14, which arc is however extinguished after a period that may be predetermined or is automatically extinguished due to the fact that there is too much distance between the workpiece 14, 31 and the welding wire 9.

Once the user has activated the wire-touch sensing process, i.e. the current source 34 has been activated for monitoring a short-circuit, the user may now position the welding torch exactly on the track at the workpiece 14. To this end, the welding torch 7 is manually moved horizontally and/or vertically across the robot operator panel, and the user has now the possibility to carry out the positioning via the welding wire 9, i.e. leading the welding torch 7 until the end of the welding wire 9 has been positioned at the desired position—e.g. at the position 100 according to FIG. 9. The welding torch 7 is for example according to FIG. 6 moved vertically in direction towards the workpiece 14 according to arrow 38. As now the wire-touch sensing process is activated, the user is not required to consider the welding wire 9, in particular the contact of the welding wire 9 with the workpiece 14, any longer, as a so-called collision protection is provided by the wire-touch sensing process and it is thus avoided that the welding wire 9 is bent when contacting the workpiece 14. It is therefore possible for the user to move the welding torch 7 towards the workpiece 14 without problems, as shown, because the welding wire 9 is retracted as soon as a short-circuit is detected and it is thus dropped below the stickout length l the stickout length l is reduced, as it is shown in FIG. 6 by means of dashed lines. This bears the advantage that the user can see the exact position of the welding torch 7 at the workpiece 14 and thus the deviation from the desired position 100. It is due to the position of the welding wire 9 also possible to draw conclusions with respect to the centre of the welding torch 7, since there is no distance between the welding wire 9 and the workpiece 14 and the orientation of the welding wire 9 has not been changed.

As the wire-touch sensing process is activated, the welding derive 1 recognizes short-circuit and feeds the welding wire 9 immediately back according to arrow 39 in FIG. 6. If the user keeps directing the welding torch 7 in the direction towards the workpiece 14, the automatically initiated retracting of the welding wire 9 prevents the welding wire 9 from being bent, i.e. the user is not required to consider the stickout 1 of the welding wire 9 and can approach the welding torch 7 to the workpiece as close as desired, since the welding wire 9 is retracted in the direction opposite to the movement of the welding torch immediately once a short circuit has been detected and a bending of the welding wire 9 is thus avoided.

If the user stops the movement of the welding torch in the direction of the workpiece 14, the retracting of the welding wire 9 is however continued, as there is still a short-circuit. It is according to FIG. 7 visible that the welding wire 9 is always retracted so far, that it is lifted from the surface of the workpiece 14 and e.g. an arc 37 is ignited to allow the optical perception of the position. Subsequently, the retraction is stopped and the welding device 1 initiates the feeding of the welding wire 9 to its length l, i.e. once the welding wire 9 has been lifted from the workpiece 14, 31, the wire feed is reversed and the welding wire 9 is fed to its stickout length l or the process is repeated if there is another short-circuit. Actually, a continuous back-and-forth movement is carried out—as schematically indicated by arrow 39 in FIG. 7—as long as the distance between the welding torch 7 and the workpiece 14, 31 is smaller than the pre-set length/stickout 1.

It should generally be noted that the speed of feeding back the welding wire is preferably such selected that it is faster than the forward movement of the manually controlled welding torch 7, so that the welding wire 9 is prevented from bending, as the welding torch cannot be approached to the workpiece 14 as quickly as the welding wire 9 is fed in backward direction. The current source 34 is preferably such designed as to allow the arc 37 to be ignited when the welding wire 9 is lifted from the workpiece 14, as it is shown in FIG. 7. Due to the brief flashing of the arc 37 it advantageously achieved that the user, in the event of the workpiece 14 being poorly illuminated—in particular at automobile chassis that are difficult to access, can determine/estimate the position more easily, as a repeated ignition of the arc 37 is performed due to the continued up-and-down movement of the welding wire 9 and thus, an illumination of the surrounding is created, with the result that deviations from the desired position 100 can be seen.

As it can now be seen in FIGS. 6 and 7, the welding torch 7 is not yet positioned to be centred at the workpiece 14, in particular at the desired position 100, so that the user corrects the position of the welding torch 7 another time and adjusts it e.g. in lateral direction, as it is illustrated in FIG. 8 according to arrow 40. When a short-circuit occurs, the welding wire 9 is continuously fed back and forth again until the next short circuit occurs or until the predetermined length l is achieved. In the shown example in FIG. 8, the welding torch 7 is again placed at the workpiece 14 within the length l, so that a continuous up-and-down movement of the welding wire 9 according to arrow 39 is performed, so that at the same time—during the horizontal movement of the welding torch 7 from the position according to FIG. 7 towards the position of the welding torch 7 according to FIG. 8, according to arrow 40—the welding wire 9 is tracking the surface of the workpiece 14, i.e. its contour, due to the continuous up-and-down movement without being bent. So therefore one can say that the surface of the workpiece 14 is moved along by the welding wire 9 due to correspondingly close positioning the welding torch 7 within the stickout length l, with the result that a very precise adjusting/positioning is allowed for the welding torch 7, as, so to speak, the welding wire 9 is positioned directly on the workpiece and thus transfers the position 100 of the welding torch 7.

Once the user has manually set the desired position 100, e.g. the centre of a welding bead, as shown in FIG. 9, he/she terminates the wire-touch sensing process e.g. by repeatedly operating the switch 36 or a button, with the result that the current source 34 is disconnected from the welding torch 7. It is at the same time possible that the position of the welding torch 7, i.e. the position of the welding robot is automatically stored on terminating or that the storing of the position is manually initiated by the user. It is also possible that a welding process is started immediately once the welding torch 7 has been set up.

It is however also possible that a warning signal is issued on terminating the wire-touch sensing process, when the welding torch 7 is positioned within the stickout length l—i.e. too close to the workpiece—so that it is possible for the user to solve this problem by simply retracting the welding torch 7. It is furthermore also possible that the back-and-forth movement is stopped when the wire-touch sensing process is terminated, even if the welding torch 7 is positioned within the stickout length l, but in this case, welding wire 9 is firstly retracted until the short-circuit is released and subsequently, the back-and-forth movement is stopped and thus, the short circuit does not exist any longer. It is naturally possible that other security functions are integrated, preventing problems from occurring during the start of the welding process.

It is furthermore possible for the user to make various settings on the wire-touch sensing process. It is on the one hand possible to select a wire-touch sensing process, where the welding wire 9 is positioned in accordance with a stickout length l that may be determined, as described in FIGS. 4 to 9, or—on the other hand—the welding wire 9 is always moved out independent of the stickout length l until it contacts the workpiece 14, in other words, that the welding wire 9 is automatically fed in the direction towards the workpiece when the wire-touch sensing process is started, until the welding wire 9 together with the workpiece 14 causes a short-circuit.

It is naturally also possible to carry out the wire-touch sensing process automatically, which process previously been described as a manually performed one. In this case, e.g. the stickout length l is essentially continuously monitored and the height position of the welding torch 7 is correspondingly adjusted and thus, the desired position 100 is determined.

In an advantageous variant, a necessary deceleration of the welding torch 7 is calculated with the aid of its current speed and with the aid of the length l taking into consideration a safety distance. Ifs refers to the length l minus the safety distance, the necessary deceleration a can easily be calculated using the equation $a=v^2/2s$, with v being the speed of the welding torch 7.

After the dangerous situation has been settled, the welding wire 9 can be moved out to the length l again, in order to approach a new position in the motion sequence of the welding torch 7.

Advantageously, the distance between the welding torch 7 and the workpiece 14 later during welding corresponds to the distance between welding torch 7 and the workpiece 14, when the welding wire 9 is moved out by the determinable length l and touches the workpiece 14. Accordingly, during the teaching/testing of the motion sequence, the welding torch 7 takes the same position relative to the workpiece 14 as during welding. In this way, a particularly easy teaching is possible. In this case, the welding torch 7 is approached to desired position of the workpiece manually and comparably quickly. Once the welding wire 9 touches the workpiece 14, on the one hand, the position is stored, and on the other hand, the above described collision is avoided without the operator having to decelerate the welding torch 7 manually for this purpose. This may be performed in a fully automated way.

In a further variant of the invention, a test voltage is applied between an electrically conductive part of the welding torch 7, such as a metallic gas nozzle, and the workpiece 14. If a current flow or a drop of voltage is detected in an electric circuit wherein the mentioned conductive part of the welding torch 7 and the workpiece are situated, the welding torch 7 is stopped or retracted. It is in this context conceivable that apart from the welding wire 9, also a gas nozzle of the welding torch 7 is connected to the voltage/current source 34. It is possible that e.g. contacts reels (not shown) in the welding torch 7 take the test voltage from the welding wire 9 and pass it on to the gas nozzle or a conductive connection to the gas nozzle is created via the penstock. It is also conceivable that a separated line is provided in a hose assembly in order to pass the test voltage to the gas nozzle. The ammeter 35 or the electronic detection device then detects contacts between the welding wire 9 and the workpiece 17 as well as between the welding torch 7 and the workpiece 14. It is also conceivable that a second, own test voltage circuit is provided for the welding torch 7. For this purpose, at least one further ammeter or detection means, also a further voltage/current source is needed. It is then preferably possible to distinguish whether or not the welding wire 9 or the welding torch 7 is contacting the workpiece 14. Detecting a contact between the welding torch 7 and the workpiece 14 is here not limited to the teaching/testing of a motion sequence, but may also be used during the welding process itself It is in this way possible to detect undesired contacts between welding torch 7 and workpiece 14 also during working a motion sequence and to reduce the consequences of such contacts.

In a further variant of the embodiment, the width/height of a welding seam (finished or still to be produced) and/or the position of the welding head 29 or the welding wire 30 relative to the welding seam is determined by referring to the arrangement illustrated in FIGS. 2 and 3.

To this end, FIG. 10 shows two workpieces 31a and 31b, prepared for welding (here for a single y-seam) as well as the welding head 29 and the protruding welding wire 30. In the region of the welding seam, the welding head 29 is now moved perpendicularly with respect to the welding seam. This being the case, the position of the welding head 29 and optionally that of the welding wire 30 is stored or determined when the ammeter 35 detects the flow of a current, i.e. when the welding wire 30 touches the workpiece 31. From several stored or determined positions, the width b of the welding seam and/or the position of the welding head 29 or the welding wire 30 relative to the welding seam is determined (see the offset of the centre axis of the welding seam with respect to the centre axis of the welding head 29 or of the welding wire 30).

FIG. 11 shows the seam from FIG. 10 upon completion. It is also here possible to determine the width b of the welding seam and/or the position of the welding head 29 or of the welding wire 30 relative to the welding seam. This is effected very similar to the description in FIG. 4, merely the welding head 29 approaches the welding seam from outside.

It is naturally possible that also the elevation profile of the welding seam is measured in the cases shown in FIGS. 10 and 11. It is e.g. thus possible that the depth of the chamfer of the single y-seam or also the height of the welding seam protruding the surface of the workpiece shown in FIG. 11 are measured. It is in this way possible that the welding robot 26 is not only used for welding but also for quality checks by measuring the welding seam after welding. It is also conceivable that surface profiles or 3D illustrations of the welding seam are created by a scanning the latter in a grid like manner. In this way, e.g. the ripple of the welding seam may be measured or evaluated.

In a further variant of the invention, an alarm for a defect in the electric circuit or in a drive system of the welding wire 30 (here essentially made of the rollers 32 and the second drive control 33) is triggered when a current flow is not detected although this should have to be expected on the basis of the position of the welding head 29 or the welding wire 30 and the coordinates of the workpiece. This problem is mainly present if the shape of the workpiece 31 and its position relative to the robot base 27 is known (e.g. in checking an already stored motion sequence). If the assumed tip of the welding wire 30 is moved to the surface of the workpiece without resulting in a current flow, the setting supposed by the robot control is not in line with reality.

This may have several reasons: It is e.g. possible that a workpiece 31 different from the expected one has been put onto the working surface. It is also possible that the robot or the first drive system are defective, with the result that the welding head 29 is in reality in another place than supposed by the robot control. The same applies to the second drive control (here rollers 32) and its control 33. It is e.g. possible that the welding wire 30 has slipped through the rollers 32, with the result that the real length l does not correspond to the expected length. It is also possible that the voltage/current source 34 or the ammeter/detection means 35 is defective. Another possibility is that the welding wire 30 has melted without this having been recognized and that the tip of the latter is in reality in a position different from the expected one. This may e.g. happen if the voltage/current source 34 has been adjusted to be too intense, e.g. because it has been set for a thicker welding wire 30 than that which is actually used.

In order to avoid that each minor irregularity triggers an alarm, a tolerance value may be taken into consideration for triggering an alarm. This may be in terms of a length, e.g. some tenth parts of a millimetre, or—if a motion of the welding head 29 and/or the welding wire 30 is supposed—also in terms of a period of time, e.g. some tenth parts of a second.

Until now, the invention has been explained on the basis of a welding wire 9 or welding wire 30. The invention may naturally be unrestrictedly applied to other movably mounted welding means, e.g. to welding electrodes, even if this appears to lack practical relevance at first sight.

It is furthermore noted that the welding robot 26 may also have another design. It is e.g. possible that is designed as a gantry robot. It is possible that another drive for the welding wire 30 is provided instead of the rollers 32. It is likewise possible that a comparator or another evaluating circuit for detecting a current is used instead of an ammeter 35. The voltage/current source 34 may additionally have any voltage/current characteristic. It is advantageous, if the voltage/current source 1 is formed from the welding current/welding voltage source 34 used for welding, which source is correspondingly set for generating the test voltage. It is naturally also possible to use a separate voltage/current source 34.

It is essential that the following steps/sequences are performed for teaching a welding robot, in which a position is determined and stored by a manually controlled motion sequence:
moving a movably mounted welding wire 30/welding wire 9 out of a welding head 29/welding torch 7 to a length that may be predetermined and
moving the welding head 29/welding torch 7 to a position at a workpiece 14, 31 by means of the welding device 1 when the power supply of the welding head 29/welding torch 7 is deactivated, and that after being positioned at the position, a so-called wiretouch sensing process is started in the welding device, in which a test voltage is applied between the welding wire 30/welding wire 9 and the workpiece 14, 31 and sub-sequently, the manual positioning process with the welding head 29/welding torch 7 is continued, with the welding wire 9, 30 being retracted to interrupt the current flow whenever a current flow between welding wire 9, 30 and workpiece 14, 31 is detected. It is preferred that after the interruption, the welding wire 9, 30 is again moved to the workpiece 14, 31 or to the length l that may be determined. When the welding head 29/welding torch 7 is adjusted, the welding wire 9, 30 is repeatedly moved towards the workpiece 14, 31 and away from the workpiece 14, 31 as long as the length l has not been reached, i.e. the contour of the workpiece 14, 31 is sensed.

FIGS. 12 to 13 show a sequence for the automatic detection of a central position of a weld bead, in simplified manner in the form of a flow chart. The sequences, control processes, functions, etc. shown in the individual function blocks serve the person skilled in the art for interpretation/programming, with the programming being carried out in different ways according to the welding robot 26 and the welding device 1 used and therefore not being described in detail. The person skilled in the art is able to create single interrelated sequences on the basis of the given function blocks, so that the welding robot 26 and the welding device 1 carry out corresponding sequences/tasks.

In order to allow such an automated sequence to be carried out it is advantageous if some parameters are set/predetermined by the user before the start. For this purpose, the user can activate corresponding input menus on the welding device 1 and/or the welding robot 26. It is particularly advantageous if the seam type, such as e.g. fillet weld, butt weld, lap seam, etc. is selected/set, as the sequences are adjusted to different seam types. In the following, the sequence for producing a fillet weld is described, on the basis of which it is possible for the person skilled in the art to create the further sequences for the other types of seams or to adjust it.

At the beginning, the welding torch 7 is positioned at the workpiece 14 via the welding robot 26. This may be performed manually by the user or automatically by programming the welding robot 26, with preferably firstly a manual rough positioning of the welding torch 7 being carried out. Subsequently, a "wire teach process" 42 is started, in which a subprogram according to FIG. 13 is opened, which will be described subsequently in more detail. If the rough positioning has been carried out manually, this process should also be started manually by the user, whereas an automatic start of this process is possible to be carried out with an automated pre-programmed rough positioning.

It is subsequently possible to correct the position 43 of the welding torch and/or to adjust the angle on the basis of a possibly defined stickout 1 by the latter, whereupon an automated query follows which causes a loop, with the effect that is corrected until the correct position has been reached. If the set position corresponds to a predetermined/pre-programmed position or if the user approves the position manually, the automated query 44 will be answered with "yes", whereupon the motion of the welding head 45 is stopped. Subsequently, a submenu "stickout auto teach" 46 is activated, wherein the user has to decide how to continue the process. This being the case, there are two possibilities; "track auto teach" 47 or single point auto teach" 48. It is here possible that the sequence for the query is interrupted and the user is requested to make a corresponding selection, or that this had already been entered by the user before the process started.

If the user decides on "track auto teach" 47, it will be continued with the program sequence on the right hand side. This being the case, the "difference way sensing" 49 is getting activated, whereupon the subprogram "high speed wire touch" 42 will be started/called again. Simultaneously, the functions 50 to 56 are operated one after another:

tracing a robot track having a predefined starting and ending point, with a predefined weaving being carried out perpendicularly with respect to the seam 50;

in predefined sections of the track, the calculation 51 is effected, in which the deviation of the arithmetic average is calculated on the basis of the difference between the relative position of the wire tending at the turning points of an oscillation period 52;

correction of the position parameter—tip of the torch is positioned centrally 53;

calculating the deviation in terms of height on the basis of the difference between current length of wire and reference of stickout in central position 54;

correction of height position 55;

storing the corrected position data 56.

Once all sequences have been performed, a comparison "final position reached" 57 yes/no is effected. If the final position has been reached, the sequence is finished by selecting the function "end" 58, whereas the function "next section of track" 59 is accessed and it is subsequently returned to function 51 if the final position has not been reached. This process is repeated until all sections of the track and thus the final position, have been reached.

If, however, the user selected in the subprogram "start stickout auto teach" 46 the function "single point auto teach" 48, the sequence of functions on the left hand side would be accessed and processed. With this function, the middle of the detection/calculation of the centre of the seam would be carried out automatically, with however, the control of the motion sequence, i.e. left or right, back and forth of the welding torch 7, being carried out manually by the user, as also described in the Figures above, whereas with the previously described sequence "track auto teach" 47, the control of the motion of the torch was performed automatically by the welding robot 26.

This being the case, function 60 "step 1 search middle of seam (fillet weld)" is accessed, whereupon the functions "gas nozzle-touch sensing ON" 61 and "difference way sensing active" 62 follow, if those had been selected in the basic setting. With the function 61, a routine query "nozzle touch" is started, in which the touch of the gas nozzle with the workpiece 14 is monitored, so that it is possible for the user to adjust the welding torch 7 manually and simultaneously, the function 62 is processed, as it will be described below. If the gas nozzle touches the workpiece 14, the query will recognize this and skips to the function "stop robot" 64, whereas after the welding torch 7 has moved with no contact resulting, the process is looped back to the query. This function thus implements the function of a collision detection, runs in the background parallel to other functions and may be switched on or off by the user on demand.

With function 62, i.e. "difference way sensing", the subprogram "high speed wire touch sensing" 42 will be activated, whereupon the user may move the welding torch 7 with this being monitored.

As it is with a manual motion sequence required that the welding robot 26 and/or the welding device 1 and/or the control system firstly recognises the direction, the user is heading for, some monitoring/evaluating functions are to be performed.

To this end, the functions 65 to 73 are performed, with which functions the stickout length l is checked, the change of which forms the possibility to draw conclusions with respect to the direction of the robot's motion, with the individual functions containing the following tasks:

"moving torch tip in any direction desired perpendicular to seam" 65

"stickout getting smaller" 66, if yes

"change of stickout >5 mm" 67, if yes

"stop moving torch tip" 73

"activating storing relative position of wire and position data of robot in defined section of track of robot track" 69

"moving torch tip in opposite direction perpendicularly to seam" 70

"stickout getting smaller" 71, if yes

"change of stickout >5 mm" 72, if yes

"stop moving torch tip" 73

By means of this sequence, the welding torch 7 has once been perpendicularly moved from a starting point above the seam to be performed later, with the stickout length l having been monitored and stored for that purpose.

Once such a motion sequence has been carried out, the data have to be evaluated, for which purpose function 74 "evaluation of data" in accordance with the max length of the wire (=centre of the seam) is performed. For this purpose, function 75 "temporary storing" the position data relating to the centre of the seam is carried out as a program item in the robot—and function 76 "moving the torch tip to the temporarily stored position" is performed. Thus, the welding torch 7 is positioned in the middle/centre of the fillet weld to be created, so that it is now possible to determine the correct height, for which purpose function "step 2 adjust height" 77 is activated. This being the case, functions 78 to 80 are performed, whereupon the torch is positioned in the correct height and in the center and the program is finished with end 81. Functions 78 to 80 contain:

determining the required direction of motion of the torch tip on the basis of the difference between current length of wire and reference of stickout 78;

moving in corresponding direction until difference=0;

final storing the position data as a program item of the robot

Thus, an automated recognition of centre is completed and the corresponding position is stored, whereupon it is possible to skip to the next position and a new position in another section may be determined In order to avoid that the welding wire 9 is bent when it touches the workpiece 14, it is required for the so-called "wire-touch sensing process", in which the contact is recognized and the welding wire 9 is retracted, to be activated as it has been described in the above Figures. This is carried out by using the subprogram 42a, 42b, 42c wire-touch sensing process, as it is shown in detail in FIG. 13. Once this part of the program is activated, the individual functions are active at least partially parallel to the processes described in FIG. 12. It is for this purpose usually possible for the user to store corresponding default settings or to enter them before prior to each teaching process. After the function "start stickout auto teach" 42a has been opened, the "activating touch detector current source" 82 is accessed and the function "wire feed forward" 83 is started, with the result that the current source 34 is applied to the welding wire 9 and to the workpiece 14 and the welding wire is fed in the direction of the workpiece 14. For detecting a short circuit, the query 84 "wire touching workpiece?" is subsequently activated, and is skipped again to position 83 when no short circuit is present, i.e. the welding wire 9 is fed until it touches the workpiece 14, as otherwise the loop is not left. If the welding wire 9 touches the workpiece 14, i.e. the result of the query 84 is "yes", it is skipped to function 85 "wire feed backward", so that now the welding wire 9 is retracted from the workpiece 14 for releasing the short-circuit. This is, in turn recognized by a query 86 "wire touching workpiece", and with "no", the function "stop wire feed" is accessed and a "storing of stickout position (reference)" 87 is accessed and the submenu 42a is finished by function 88 "stickout reference adjustment end".

If, in contrast, the main program of the submenu 42b "high speed wire-touch reversing" is opened, a sequence similar to that above for submenu 42a is started. By means of function 89 "activating touch detector current source", the current source 34 is activated. Thereupon, a query 90 "wire touching workpiece" is started immediately, so that a contact may be recognized when the user adjusts the welding torch 7 manually. If no contact is present, it is for another time skipped backward to the query, whereas in the case of a contact, i.e. when the answer to the query is "yes", the function 91 "wire feed backward" is accessed and started, with the result that the welding wire 9 is moved away from the workpiece 14 immediately. In order to allow that the release of the short-circuit or, in better words, the lifting of the welding wire 9 from the workpiece 14, is detected, a query 92 is started. Subsequently, function 93 "stop wire feed" for finishing the backward movement of the welding wire 9 is performed, whereupon it is again continued with query 90, so that a corresponding loop results and the welding wire is retracted at each contact and can thus not be bent. By skipping back to query 90 it is guaranteed that in the event of any further manual adjustment of the welding torch 7 and another contact, the latter will be recognized and rectified.

If, however, submenu 42c is opened, a sensing process is started, in which the welding wire 9 may be guided over the contour of the workpiece 14, i.e. the welding wire 9 is repeatedly moved toward the workpiece for touching. The detection is started by function 94 "activating touch detector current source", as thereby the current source 34 is applied to the workpiece 14 and the welding wire 9. Thereupon, a query 95 "wire touching workpiece ", in which the function 96 "wire feed backward" for feeding back and releasing the contact is activated if there is a contact, i.e. the answer is "yes". This is in turn monitored by a query 97 "wire touching workpiece", whereupon the function 98 "wire feed forward" is accessed and thus, the welding wire 9 is moved to the workpiece again when the welding wire 9 is lifted from the workpiece 14, i.e. when the answer is "no". In order for the new short circuit or the contact to be detected, it is skipped from function 98 to query 95, so that a closed loop results.

It is furthermore possible for the positioning of the welding wire 9, that a referencing, e.g. after 5 cycles, is carried out, so that a possibly occurring slippage of the welding wire may be corrected. It is for this purpose for example possible that the welding wire is moved out by 2 cm, whereupon the user is requested to cut the latter at the contact tube, so that now a defined point is given.

The exemplary embodiments refer to possible variants of embodiment of a welding robot 26 according to the invention and it should be noted at this point that they are not intended to limit the scope of the invention to these illustrated variants of embodiments provided herein but that there are also various combinations among the variants of the embodiments themselves and variations regarding the present invention should be executed by a person skilled in the art. All and every imaginable variants of the embodiment, arising from combining single details of the variant of embodiment illustrated and described are subject to scope of protection.

The described invention is furthermore not only suitable for the teach-in technique, but can also support other programming methods, such as for example the playback method, the offline-programming, CAD-supported programming and for the acoustic programming. This being the case, the invention can be applied to all kinds of welding robots and welding systems. Variants and their advantages disclosed regarding welding robots, thus also refer to welding systems and vice versa.

For the sake of good order, finally, it should be pointed out that, in order to provide a clearer understanding of the structure of the welding robot 26, it and its constituent parts are illustrated to a certain extent out of scale and/or on a larger scale and/or on a smaller scale.

The fundamental function of the independent inventive solutions can be taken from the description.

| | List of Reference Numerals |
|---|---|
| 1 | Welding device |
| 2 | Current source |
| 3 | Power element |
| 4 | Control device |
| 5 | Gas |
| 6 | Gas tank/storage |
| 7 | Welding torch |
| 8 | Wire feed |
| 9 | Welding wire |
| 10 | Delivery spool |
| 11 | Housing |
| 12 | Carriage |
| 13 | Arc |
| 14 | Workpiece |
| 15 | Cooling device |
| 16 | Water container |
| 17 | Fill level indicator |
| 18 | Input a/o output device |
| 19 | Welding torch input a/o output device |
| 20 | Heat shield |
| 21 | Hose assembly |
| 22 | Kink protector |
| 23 | Rub protector |
| 24 | Option carrier |
| 25 | Holding device |
| 26 | Welding robot |
| 27 | Robot base |
| 28 | Robot arm |
| 29 | Welding head |
| 30 | Welding wire |

-continued

| | List of Reference Numerals |
|---|---|
| 31 | Workpiece |
| 31a | First part of workpiece |
| 31b | Second part of workpiece |
| 32 | Roller |
| 33 | Second drive control |
| 34 | Voltage/Current source |
| 35 | Ammeter |
| 36 | Switch |
| 37 | Arc |
| l | Length, by which the welding medium projects beyond the welding head |
| b | Width of welding seam |

The invention claimed is:

1. A method of welding with a welding robot along a motion sequence, the method comprising the steps of
a) teaching the welding robot the motion sequence without performing a welding process by:
moving a movably mounted welding wire out of a welding head to a length;
moving the welding head to a first position at a workpiece when a power supply of the welding head is deactivated;
after positioning at the first position, starting a wire-touch sensing process in a welding device, the wire-touch sensing process comprising the steps of:
applying a test voltage between the welding wire and the workpiece, wherein the test voltage or the therefrom resulting current flow is provided to be lower than an arc-forming voltage required for forming an arc or an arc-forming current required for forming the arc;
subsequently, continuing a manual positioning process with the welding head; and
retracting the welding wire to prevent bending of the welding wire and to interrupt a current flow between the welding wire and the workpiece when the welding wire touches the workpiece and the current flow or a drop of the test voltage is detected, and
b) after teaching the welding robot the motion sequence, welding with the welding robot along the motion sequence.

2. The method according to claim 1, wherein the welding wire is again moved to the workpiece or to the length that is predetermined after the interruption.

3. The method according to claim 1, wherein when the welding head is adjusted, the welding wire is repeatedly moved to and back from the the workpiece, that is a contour of the workpiece is sensed, as long as the length has not been achieved.

4. The method according to claim 1, wherein a speed of feeding back the welding wire is selected as to be always higher than a speed of the forward motion of a manually controlled welding torch.

5. The method according to claim 1, wherein a current source limits an amount of power in such a way that a short-circuit does not result in a melting of the welding wire and the workpiece, but a contacting of both of them is recognized as soon as possible, with however a further monitoring, open-loop and closed-loop functions for an actual welding process, such as a release of the short-circuit, a wire feed, a protective gas supply, and a cooling circuit of the welding device remaining deactivated.

6. The method according to claim 1, wherein a distance between the welding head and the workpiece later during the welding process, corresponds to that distance, at which the welding wire moved out to the length that is predetermined touches the workpiece.

7. The method according to claim 1, wherein after the wire-touch sensing process has started, the welding wire is moved out until the current flow is detected.

8. The method for teaching the welding robot according to claim 1, comprising the following steps:
I) applying the test voltage between the welding wire and the workpiece by activating the wire-touch sensing process,
II) moving the welding head at the workpiece along the motion sequence,
III) moving the movably mounted welding wire out of the welding head until the current flow is detected in that electric circuit wherein the welding wire and the workpiece are positioned, and
IV) retracting the welding wire by a retraction distance that is predetermined and repeating steps I) to IV).

9. The method according to claim 1, wherein the length by which the welding wire is moved out of or back into the welding head is measured or set via a device selected from a group consisting of an input device, an output device and an input/output device or defined by touching the workpiece.

10. The method according to claim 1, wherein the test voltage or the therefrom resulting current flow is provided to be lower than a welding wire melting voltage required for melting the welding wire or a welding wire melting current required for melting the welding wire.

11. The method according to claim 1, further comprising the steps of:
moving the welding head in an area of a finished welding seam or a welding seam to be produced perpendicularly to a course of the finished welding seam or the welding seam to be produced,
storing or determining position information for at least one of the welding head and the welding wire whenever the current flow or the drop of the test voltage is detected in an electric circuit, and
calculating at least one of a width of the welding seam, a height of the welding seam, a welding head location of the welding head relative to the welding seam and a welding wire location of the welding wire relative to the welding seam on the basis of the position information store or determined.

12. The method according to claim 1, wherein during an evaluation of the welding wire feeding process, a longest stickout is determined, to which a central position of the welding seam corresponds.

13. The method according to claim 1, wherein an alarm is triggered, whenever the current flow or the drop of voltage is not detected although this should have to be expected on the basis of the position of the welding head or the welding wire and a position of the workpiece.

14. The method according to claim 1, wherein:
the test voltage is applied between an electrically conductive part of the welding head and the workpiece and
the welding head is stopped or retracted whenever the current flow or the drop of the test voltage is detected in an electric circuit wherein said conductive part and the workpiece are positioned.

15. A method of welding comprising the steps of:
a) automatically detecting a central position of an intended weld bead without performing a welding process by:
positioning a welding head at a workpiece;

after the positioning, starting a wire-touch sensing process in a welding device, the wire-touch sensing process comprising the steps of:

applying a test voltage between a welding wire and the workpiece, wherein the test voltage or the therefrom resulting current flow is provided to be lower than a voltage required for forming an arc or a current required for forming the arc;

feeding the welding wire in a direction of the workpiece; and retracting the welding wire for preventing bending of the welding wire and for interrupting a current flow between the welding wire and the workpiece whenever the welding wire touches the workpiece and the current flow is detected;

subsequently, tracing a preprogrammed track running perpendicular to an axis of the intended weld bead; and when the welding head is adjusted, repeatedly moving the welding wire to the workpiece and back from the workpiece to sense a contour of the workpiece and calculating the central position on a basis of values of wire lengths which have been fed; and b) after detecting the central position, welding the workpiece and forming the weld bead running perpendicular to the preprogrammed track.

16. The method according to claim 15, comprising the following steps:

moving a movably mounted welding wire out of the welding head to a length and moving the welding head to a position at the workpiece wherein after positioning at the position, the wire-touch sensing process is started in the welding device, wherein the test voltage is applied between the welding wire and the workpiece and subsequently, a manual positioning process is continued with the welding head, with the welding wire being retracted to interrupt the current flow when the current flow between the welding wire and the workpiece or a drop of the test voltage is detected, wherein a control system comprises:

a first outlet for actuating a first driving system, which is provided for moving the welding head to the position at the workpiece, a second outlet for actuating a second drive system, which is provided for moving the movably mounted welding wire out of the welding head to the length, wherein the control system comprises a detection device for detecting the current flow in an electric circuit and means for starting the wire-touch sensing process after the positioning at the position has been carried out, with the wire-touch sensing process being set up for applying the test voltage between the welding wire and the workpiece and to continue subsequently the manual positioning process with the welding head and the control system is set up for outputting a command via the second outlet causing the retraction of the welding wire for interrupting the current flow, whenever the current flow between the welding wire and the workpiece or a drop in the test voltage is detected, and wherein a welding plant comprises the welding device and a welding robot that are coupled to each other by means of lines, and a welding torch attached to the welding robot with the welding torch being led along a predetermined track by the welding robot and an open-loop control and closed-loop control of the welding process carried out simultaneously being executed from the welding device, wherein before the welding process is carried out, a manually controlled teaching-process, with which a position is determined and stored by way of a manually implemented motion sequence, is performed, comprising the following steps:

moving the movably mounted welding wire out of the welding head to the length that is predetermined and moving the welding head to the position at the workpiece when a power supply of the welding head is deactivated, starting a teaching-process in the welding device after positioning at the position, in which process, the test voltage is applied between the welding wire and the workpiece and subsequently, the manual positioning process is carried out with the welding head, and when the current flow between the welding wire and the workpiece or the drop of the test voltage is detected, the welding wire is retracted for releasing the current flow and after a release, the welding wire is moved to the workpiece or to the length that is predetermined, and wherein the welding wire is repeatedly moved to the workpiece and back from the workpiece along a contour of the workpiece, as long as the length has not been achieved.

* * * * *